3,035,056
PROCESSES FOR PREPARING SODIUM AND
POTASSIUM DICHLOROISOCYANURATE
William F. Symes, Webster Groves, Mo., assignor to Monsanto Chemical Company, St. Louis, Mo., a corporation of Delaware
No Drawing. Filed Sept. 5, 1961, Ser. No. 135,749
14 Claims. (Cl. 260—248)

The present invention relates to the manufacture of sodium dichloroisocyanurate, potassium dichloroisocyanurate, and/or hydrates thereof or mixtures of these compounds, and more specifically relates to the manufacture of sodium dichloroisocyanurate and hydrates thereof by direct chlorination of trisodium isocyanurate in an aqueous medium and to a method of making potassium dichloroisocyanurate by direct chlorination of tripotassium isocyanurate in an aqueous medium.

Anhydrous sodium dichloroisocyanurate, potassium dichoroisocyanurate or hydrates thereof or mixtures of these compounds are highly useful sources of available chlorine in solid bleach and detergent compositions. For example, sodium dichloroisocyanurate, sometimes termed sodium dichlorocyanurate, and hydrates thereof which can be represented structurally as

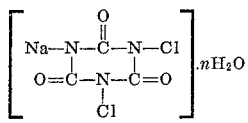

wherein $n$ is an integer from 0 to 2, recently have been found to be a highly useful source of available chlorine in solid bleach and detergent compositions. The dihydrate which contains approximately 14.1% by weight of water of hydration, the monohydrate which contains approximately 7.6% by weight of water of hydration and the anhydrous salt are white crystalline compounds having distinct X-ray diffraction patterns.

Also, for example, anhydrous potassium dichloroisocyanurate sometimes termed potassium dichlorocyanurate, which can be represented structurally as

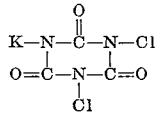

and the monohydrate thereof is also a highly useful source of available chlorine in solid bleach and detergent compositions.

The novel processes for preparing sodium dichloroisocyanurate or hydrates thereof and potassium dichloroisocyanurate or the monohydrate thereof, were disclosed in part in applications for Letters Patent, Serial No. 757,690, filed in the United States Patent Office, August 28, 1958, and Serial No. 800,099, filed in the United States Patent Office, March 18, 1959, both of which applications are assigned to the same assignee as the assignee of the present application. The disclosure contained in the present application should be taken in conjunction with said applications for Letters Patent, Serial No. 757,690 and Serial No. 800,099 and considered as a continuation-in-part of said applications.

It is an object of the invention to provide a commercially safe and practical method for making sodium dichloroisocyanurate, potassium dichloroisocyanurate and hydrates thereof as well as mixtures of these compounds and to obtain these products in good yields and without the formation of dangerous and harmful reaction products such as nitrogen trichloride.

It has been found possible in accordance with this invention to prepare sodium dichloroisocyanurate, potassium dichloroisocyanurate or mixtures thereof by a process which comprises bringing together and reacting chlorine and trisodium isocyanurate, tripotassium isocyanurate or mixtures thereof, respectively, in an aqueous medium in a reaction zone maintained at a temperature in the range of from 0° C. to 60° C.; the rate of addition and of mixing the isocyanurate being such as to maintain a pH in the range of about 6.0 to about 8.5, thereby forming an aqueous reaction mixture in the reaction zone having a pH in the above mentioned range and comprising an aqueous slurry of sodium dichloroisocyanurate, potassium dichloroisocyanurate or mixtures thereof, respectively, and separating the resulting dichloroisocyanurate solids from the bulk of the aqueous phase at the reaction mixture.

When trisodium cyanuate is used in the process, sodium dichloroisocyanurate can be formed and when tripotassium cyanurate is used in the process, potassium dichloroisocyanurate can be produced. Mixtures of sodium and potassium dichloroisocyanurate can be produced from mixtures of these tri-metal cyanurates.

In accordance with this invention, it has been found that sodium dichloroisocyanurate and hydrates thereof can be prepared in a convenient, efficient and economical manner, the process essentially comprising bringing together and reacting trisodium isocyanurate (often termed trisodium cyanurate) with gaseous or liquid chlorine in an aqueous medium while maintaining the pH in the range of 6.0 to 7.5 and the reaction temperature in the range of from about 10° C. to about 35° C. and separating the solid reaction product from the bulk of the aqueous phase of the aqueous reaction mixture. The water wet solid reaction product so obtained is sodium dichloroisocyanurate dihydrate which can be freed of moisture to provide dry crystalline dihydrate or dehydrated to provide the dry crystalline monohydrate or anhydrous salt or any combination thereof.

In general, an aqueous solution of trisodium isocyanurate, preferably one containing from 2 to 11 parts by weight of sodium isocyanurate per 100 parts by weight of water, will be added to a suitable reaction vessel while simultaneously adding and intimately mixing chlorine therewith, said chlorine being added as a liquid or a gas but preferably as a gas or in a partially gaseous state. It is necessary that the chlorine and the aqueous solution of trisodium isocyanurate be added at such a rate and with sufficient agitation to maintain the aqueous reaction mixture at a pH in the range of 6.0 to 7.5, but preferably in the range of from about 6.5 to about 7.3, otherwise, the yield of the desired sodium dichlorocyanurate will be substantially decreased. Additionally, at a pH above 7.5 considerable decomposition of the triazine ring of the isocyanurate takes place evolving nitrogen trichloride and thereby producing highly hazardous conditions. The maintaining of the pH in the range of 6.0 to 7.5 and particularly 6.5 to 7.3 defines substantially stoichiometric amounts of the respective reagents, that is, substantially two molecular proportions of chlorine and substantially one molecular proportion of trisodium isocyanurate.

If trisodium isocyanurate is reacted or chlorinated with a chlorine gas at a pH below about 6.0 but above about 4.5, the reaction product formed is a mixture of sodium dichloroisocyanurate and trichloroisocyanuric acid. If trisodium isocyanurate is reacted or chlorinated with chlorine gas at a pH of about 4.5 or below the reaction product formed is trichloroisocyanuric acid.

During the addition of chlorine to and mixing with the aqueous solution of trisodium isocyanurate the aqueous reaction mixture in the reaction zone is maintained at a temperature in the range of from about 10° C. to about 35° C., but preferably in the range of from about 20° C. to about 30° C.

Upon adding chlorine to and intimately mixing with the aqueous solution of trisodium isocyanurate in accordance with the process of this invention, there is obtained an aqueous reaction mixture having a pH in the range of 6.0 to 7.5, but preferably in the range of from about 6.5 to about 7.3, which comprises a slurry of the reaction product (i.e. sodium dichloroisocyanurate dihydrate) of said reactants which reaction product is moderately soluble in the aqueous medium (approximately 8.5 parts by weight per 100 parts by weight of a 6.3% aqueous NaCl solution at 25° C.).

In the instant process upon maintaining the aforedescribed pH limitation at the completion or cessation of the aqueous trisodium isocyanurate addition there is consumed a substantially stoichiometric amount of chlorine (i.e., two molecular proportions of chlorine per molecular proportion of trisodium isocyanurate) in the reaction system, whereupon the addition of chlorine is stopped and the aqueous reaction mixture agitated slowly while cooling, preferably at about 5° C. The solids are then separated from the bulk of the aqueous phase of the aqueous reaction mixture in the reaction zone by any of the well-known methods for separating solids from liquids, e.g., filtration, decantation, centrifugation and the like, and then dried to remove water either combined (i.e., water of hydration) or uncombined so as to provide the dihydrate or the monohydrate or the anhydrous salt or any mixture thereof. The mother liquor or supernatant can be discarded or used as a heel in further operations. Alternatively and preferably, the said mother liquor or supernatant can be subjected to vacuum concentration, e.g., at 25° C. to 50° C., to remove a substantial proportion of the water, as for example up to about 50% thereof. By so operating, additional amounts of the dihydrate reaction product are precipitated and separated from the aqueous phase associated therewith, which solids can be admixed with the initial separated solids and dried or dried separately. When so operating in that the aqueous phase will contain but a very small amount of sodium dichloroisocyanurate and a relatively large amount of sodium chloride by-product, it is preferably discarded rather than be used as a heel in subsequent operations.

It is preferred that in the instant process that the reaction product, i.e. sodium dichloroisocyanurate dihydrate, so formed in the aqueous reaction mixture in the reaction zone be continuously removed from the reaction zone together with a portion of the aqueous medium associated therewith so as to maintain the volume of the aqueous reaction mixture in the reaction zone substantially constant. The sojourn time of an increment of trisodium isocyanurate and an increment chlorine in the reaction zone required to produce an increment of the reaction product of said reactants is usually less than 15 minutes and preferably less than 5 minutes.

As illustrative of the process of this invention but not limitative thereof is the following:

*Example I*

To a suitable reaction vessel equipped with a thermometer, agitator, an off-gas tube, and an ice bath for controlling the reaction temperature is added 195 parts by weight of trisodium isocyanurate in the form of a 9.35% by weight aqueous solution thereof. Simultaneously with the addition of the trisodium isocyanurate, gaseous chlorine is added at a rate and with sufficient agitation to disperse the chlorine in the aqeuous solution to maintain a pH in the reaction zone in the range of 6.8±0.1. Throughout the addition of the said reagents, the reaction mixture in the reaction zone is maintained at a temperature in the range of 26±2° C. Upon so maintaining the reaction mixture at said reaction temperature and said pH, at the completion of the addition of aqueous trisodium isocyanurate, substantially 142 parts by weight of chlorine is consumed. At the completion of the addition of trisodium isocyanurate at which point the addition of chlorine is stopped the aqueous reaction mixture is agitated for a few minutes and then cooled to 5° C., and filtered. The filter cake (which contains a total of 29% water) is then dried at 30° C. under vacuum for about 1 hour yielding 170 parts by weight of substantially pure crystalline sodium dichloroisocyanurate dihydrate. The filtrate is then vacuum concentrated at 20° C. to remove approximately 42% by weight of the water and the residue cooled to 5° C. and again filtered and the filter cake dried at 30° C. under vacuum for about 1 hour yielding 60 parts by weight of substantially pure crystalline sodium dichloroisocyanurate dihydrate. The total yield of crystalline sodium dichloroisocyanurate dihydrate based on trisodium isocyanurate charged is 90% by weight. During the entire course of the above procedure no detectable quantity of NCl₃ was formed.

*Example II*

To a suitable reaction vessel equipped with a thermometer, agitator, an off-gas tube, and an ice-bath for controlling the reaction temperature is added 195 parts by weigt of trisodium isocyanurate in the form of a 10.5% by weight aqueous solution thereof. Simultaneously with the addition of the trisodium isocyanurate, gaseous chlorine is added at a rate and with sufficient agitation to disperse the chlorine in the aqueous solution to maintain a pH in the reaction zone of 7.0. Throughout the addition of the said reagents, the reaction mixture in the reaction zone is maintained at a temperature of 30±2° C. Upon so maintaining the reaction mixture at said reaction temperature and said pH, at the completion of the addition of aqueous trisodium isocyanurate, substantially 142 parts by weight of chlorine is consumed. At the completion of the addition of trisodium isocyanurate at which point the addition of chlorine is stopped and the aqueous reaction mixture is agitated for a few minutes and then cooled to 5° C. and centrifuged. The centrifuged cake (which contains a total of about 25% water) is then dried at 105° C. for about 8 hours in a hot air circulating oven yielding 144 parts by weight of substantially pure anhydrous crystalline sodium dichloroisocyanurate. The centrifuge effluent is then vacuum concentrated at 25° C. to remove approximately 50% by weight of the water and the residue cooled to 5° C. and again centrifuged and the centrifuge cake dried at 105° C. for about 6 hours yielding 50 parts by weight of substantially pure anhydrous crystalline sodium dichloroisocyanurate. The total yield of anhydrous crystalline sodium dichloroisocyanurate based on trisodium isocyanurate charged is 88% by weight. During the course of the above procedure no detectable amounts of NCl₃ were formed.

*Example III*

To a suitable reaction vessel equipped with a thermometer, agitator, an off-gas tube, and an ice-bath for controlling the reaction temperature is added 195 parts by weight of trisodium isocyanurate in the form of a 9.35% by weight aqueous solution thereof. Simultaneously with the addition of the trisodium isocyanurate gaseous chlorine is added at a rate and with sufficient agitation to disperse the chlorine in the aqueous solution to maintain a pH in the reaction zone in the range of 6.8±0.1. Throughout the addition of the said reagents, the reaction mixture in the reaction zone is maintained at a temperature in the range of 26±2° C. Upon so maintaining the reaction mixture at said reaction temperature and said pH at the completion of the addition of aqueous trisodium isocyanurate, substantially 142 parts by weight of chlorine is consumed. At the completion of the addition of trisodium isocyanurate at which point the addition of chlorine is stopped the aqueous reaction mixture is agitated for a few minutes and then cooled to 5° C. and filtered. The filter cake (which contains a total of 32% water) is then dried at 70° C. under vacuum for about 3 hours yielding 156 parts by weight of substantially pure crystalline sodium dichloroisocyanurate monohydrate. The filter effluent is then vacuum concentrated at 20° C. to remove approximately 47% by weight of the water and the residue cooled to 5° C. and again filtered and the filter cake dried at 65° C. under vacuum for about 2.5 hours yielding 54 parts by weight of substantially pure crystalline sodium dichloroisocyanurate monohydrate. The total yield of crystalline sodium dichloroisocyanurate monohydrate based on trisodium isocyanurate charged is 89% by weight.

In the process of this invention it is desirable that sufficient water be present to maintain the trisodium isocyanurate in solution. The trisodium isocyanurate is preferably added in the form of an aqueous solution, which can be pre-heated up to about the desired reaction temperature, and when so employed it is particularly preferred that the solution be as concentrated as possible.

With respect to the water content in the reaction zone such should be in excess of about 70% by weight of the total contents thereof. Employing such a water limitation in general the final dried reaction product is substantially free of sodium chloride impurity, that is, less than about 3% NaCl. Also, throughout the entire course of the above procedure substantially no $NCl_3$ was formed or could be detected.

While, as aforenoted, the maintaining of a pH in the range of 6.0 to 7.5 but particularly from about 6.5 to about 7.3 in the reaction zone defines the stoichiometry of the reaction, that is substantially two moles of chlorine per mol of trisodium isocyanurate, the amount of chlorine consumed in the reaction should not be more than about 2.05 moles per mol of trisodium isocyanurate otherwise overchlorination will occur.

In the process of this invention it is particularly preferred that the respective reagents be added to a heel, that is, water or an aqueous solution of sodium dichloroisocyanurate, and as illustrative of such is the following:

*Example IV*

To a 2.5 liter chlorination vessel equipped with a thermometer, agitator, an off-gas tube and an ice-bath for controlling the reaction temperature is charged 22 grams of sodium dichloroisocyanurate in the form of a 5% aqueous solution thereof which solution is characterized by a pH of 7.0. Thereto is continuously added 1,950 grams of trisodium isocyanurate in the form of a 10% by weight aqueous solution thereof. Simultaneously with the aqueous trisodium isocyanurate solution addition gaseous chlorine is added at a rate and with sufficient agitation to disperse the chlorine in the aqueous solution to maintain a pH of 7.0±0.2 in the reaction zone. Throughout the addition of the respective reagents the reaction mixture in the reaction zone is maintained at a temperature of about 30±2° C. A substantially constant volume of approximately 2 liters is maintained in the reaction zone by removing a portion of the solid reaction product (that is sodium dichloroisocyanurate dihydrate) together with the aqueous phase of the slurry periodically by means of a suction pump into a suitable receiver. The sojourn time of the reaction product in the reactor is about 5 minutes. The slurry so removed, which contains the dihydrate of sodium dichloroisocyanurate and water having dissolved therein sodium chloride and sodium dichloroisocyanurate, is vacuum concentrated at about 50° C. to remove substantially 45% of the water. The residue is cooled o about 10° C. and centrifuged. The centrifuge cake, which is crystalline sodium dichloroisocyanurate dihydrate in admixture with about 4.0% free water, is then dried at 35° C. under vacuum yielding 2,300 grams of white crystalline sodium dichloroisocyanurate dihydrate. The amount of chlorine consumed is 1,415 grams. Again, as in the previous examples, no detectable amount of $NCl_3$ was formed.

In Examples I, II, III and IV, while the filtrate or centrifuge effluent obtained after the vacuum concentration operation can be discarded in that it contains a large amount of the sodium chloride by-product and but a small amount of sodium dichloroisocyanurate, if desired, additional amounts of the latter in the form of the dihydrate can be recovered by a salting-out operation, i.e., a soluble amount of sodium chloride can be added to the said filtrate or centrifuge effluent and the mass filtered or centrifuged.

The products of the aforementioned processes, that is, sodium dichloroisocyanurate and the hydrates thereof, are free-flowing materials and are useful as the active constituents of compositions having oxidizing, bleaching and disinfecting properties and can be compounded with various surfactants to provide detergent compositions further characterized by oxidizing, bleaching and disinfecting properties. The anhydrous salt is also useful as a lachrymator and as a halogenating agent. For most purposes sodium dichloroisocyanurate will be used in the anhydrous or substantially anhydrous form, that is having a water content whether combined or uncombined of less than about 2% by weight. For most uses to which sodium dichloroisocyanurates and hydrates thereof are put in a small amount (e.g. less than about 5%) of sodium chloride impurity, which is a by-product of the process of this invention, is not detrimental and need not be removed therefrom.

In accordance with this invention it has also been found that anhydrous or substantially anhydrous potassium dichloroisocyanurate can be prepared in a convenient, efficient and economical manner, the process essentially comprising chlorinating tripotassium isocyanurate (often termed tripotassium cyanurate) with gaseous or liquid chlorine in an aqueous medium while maintaining the pH in the range of 7.0 to 8.5 and the reaction temperature in the range of from about 0° to about 60° C., separating the solid reaction product and drying or dewatering same to provide an anhydrous or substantially anhydrous (i.e., not more than about 2% by weight of water) product.

In general, a flowable mixture of water and tripotassium isocyanurate, for example, one containing from 3 to 50 parts by weight of the said potassium salt per 100 parts water, will be added to a suitable vessel while simultaneously adding and intimately mixing chlorine therewith, said chlorine being added as a liquid or a gas but preferably as a gas or in a partially gaseous state. It is necessary that the chlorine and the flowable mixture of water and tripotassium isocyanurate be added at such a rate and with sufficient agitation to maintain the reaction mass at a pH in the range of 7.0 to 8.5, but preferably in the range of from about 7.0 to about 7.9, otherwise, the yield of the desired potassium dichlorocyanurate reaction product will be substantially decreased. It has been observed that at pH above 8.5 considerable decomposition of the triazine ring of the isocyanurate takes place evolving nitrogen trichloride and thereby producing highly hazardous conditions. Employment of a pH in the range of 7.0 to 8.5 and particularly a pH in the range of from about 7.0 to about 7.9 defines substantially stoichiometric amounts of the respective reagents, that is, substantially two molecular proportions of chlorine and substantially one molecular proportion of tripotassium isocyanurate.

If tripotassium isocyanurate is reacted with liquid or gaseous chlorine at a pH below 7.0, the reaction product formed is either a mixture of potassium dichloroisocyanurate and a distinctly different potassium-containing complex compound (which is not trichlorocyanuric acid), or a mixture of potassium-containing complex compounds, or such complex compounds per se.

During the addition of chlorine to and mixing with the mixture of water and tripotassium isocyanurate the mass is maintained at a temperature in the range of from about 0° C. to about 60° C., but preferably in the range of about 15° C. to about 50° C. It is particularly preferred that the reaction temperature be in the range of from about 20° C. to about 40° C. Depending upon the reaction temperature employed in the process of this invention, anhydrous potassium dichloroisocyanurate can be ultimately recovered in one of two different physical forms or mixtures thereof. For purposes of this invention, one anhydrous form will be called Form I and the other anhydrous form will be called Form II. Form I potassium dichloroisocyanurate is a white crystalline solid whose internal and external symmetry is monoclinic. Form II potassium dichloroisocyanurate is a white crystalline solid whose internal symmetry is monoclinic but whose external symmetry is triclinic. These anhydrous forms have the same X-ray diffraction pattern and both decompose without melting at above about 230° C. They cannot be transformed into one another by heat treatment or exposure to surface moisture. When tripotassium isocyanurate is chlorinated in accordance with the process of this invention at a temperature above about 56° C. anhydrous Form I separates from the reaction mass. However, when tripotassium isocyanurate is chlorinated according to the process of this invention at a reaction temperature below about 52° C. the solid which precipitates is potassium dichloroisocyanurate monohydrate, which monohydrate on losing its water of hydration gives Form II potassium dichloroisocyanurate. When reaction temperatures in the range of about 52° C. to 56° C. are employed, the separated solids are a mixture of Form I potassium dichloroisocyanurate and potassium dichloroisocyanurate monohydrate, which mass on drying to remove the water provides a mixture of the respective anhydrous forms, that is, a mixture of Form I and Form II. With respect to the monohydrate of potassium dichloroisocyanurate, which separates from a reaction mass obtained upon chlorinating tripotassium isocyanurate at a temperature below about 52° C., this product is a white crystalline solid whose internal and external symmetry is triclinic and whose X-ray diffraction pattern is distinct from either that of Form I or Form II potassium dichloroisocyanurate which patterns as aforenoted are the same. This monohydrate of potassium dichloroisocyanurate upon losing its water of hydration yields Form II potassium dichloroisocyanurate. However, the dehydrated crystal maintains the same size and shape of the parent monohydrate. In other words, Form II potassium dichloroisocyanurate is the pseudomorph of the monohydrate of potassium dichloroisocyanurate.

Upon adding chlorine to and intimately mixing with the flowable mixture of water and tripotassium isocyanurate in the reaction zone in accordance with the process of this invention, there is obtained an aqueous reaction mixture having a pH in the range of 7.0 to 8.5, but preferably one having a pH in the range of from about 7.0 to about 7.9, which comprises a slurry of the dichloroisocyanurate reaction product of said reactants (i.e., Form I potassium dichloroisocyanurate or the monohydrate potassium dichloroisocyanurate or mixture thereof depending upon the reaction temperature as aforementioned) and dissolved potassium chloride, which dichloroisocyanurate reaction product is slightly soluble in the aqueous reaction medium (approximately 3 parts by weight per 100 parts by weight of a 5% aqueous KCl solution at 25° C.). It is particularly preferred that the reaction zone to which the respective reagents are added be initially charged with an aqueous heel, which may be water per se or an aqueous solution of potassium dichloroisocyanurate and/or potassium chloride. A particularly useful aqueous heel is the mother liquor (e.g. the cetrifuge effluent) of a previously conducted reaction wherein tripotassium isocyanurate is chlorinated in accordance with the process of this invention.

As aforementioned the instant process is conducted in a continuous manner. That is, chlorine as a gas or liquid but preferably as a gas or in a partially gaseous state and tripotassium isocyanurate respectively are continuously and simultaneously brought together in an aqueous medium in a reaction zone, the respective reagents being added at such a rate and under such agitating conditions that the resulting reaction mass maintains a pH in the range of 7.0 to 8.5, but preferably in the range of from about 7.0 to about 7.9 and is (i.e., the reaction mass) maintained at a temperature in the range of from about 0° C. to about 60° C., preferably in the range of from 15° C. to 50° C. It is particularly preferred that the range employed be from about 20° C. to about 40° C. There is thus formed an aqueous reaction mixture having a pH in the range of 7.0 to 8.5 but preferably from 7.0 to about 7.9 which comprises an aqueous slurry of the reaction product of said reactants (i.e., Form I potassium dichloroisocyanurate or the monohydrate of potassium dichloroisocyanurate or mixture thereof depending upon the reaction temperatures as hereinbefore discussed) and dissolved potassium chloride. The reaction product so formed in the aqueous reaction mixture in the reaction zone is preferably continuously removed from the reaction zone together with a portion of the aqueous medium, preferably so as to maintain the volume of the aqueous reaction mixture in the reaction zone substantially constant. The sojourn time of an increment of tripotassium isocyanurate and an increment of chlorine in the reaction zone required to produce an increment of the reaction product of said reactants is usually less than 5 minutes. The solid reaction product of said reactants is then separated from the bulk of the aqueous phase with which it is associated in the aqueous reaction mixture by any of the well-known methods of separating solids from liquids such as filtration, decantation, centrifugation and the like. It is preferred that the removed aqueous reaction mixture be cooled, for example to a temperature in the range of about 10° C. to about 20° C., before separating the solids from the bulk of the aqueous phase with which they are associated. The separated solids are then dried so as to remove water either combined or uncombined to provide a product having less than 2% by weight of water. When such a cooling operation is employed prior to the solids separation step, the mother liquor or supernatant which contains but a small amount of the desired reaction product (solubility of $KCl_2N_3C_3O_3$ in a 7.5% aqueous potassium chloride solution at 10° C. is 1.2%) and relatively large amount of potassium chloride byproduct can be discarded or can be vacuum concentrated, as for example, at a temperature of about 25° C. to about 50° C. to remove a substantial proportion of the water, as for example up to about 50% thereof. By so doing additional amounts of the desired reaction product precipitate and are readily removed as for example, by filtration or centrifugation and dried.

As illustrative of the process of this invention but not limitative thereof is the following:

*Example V*

Approximately 100 cubic centimeters of water is charged into a cylindrical glass reaction vessel having an internal diameter of 4 inches and an internal height of 7 inches, which vessel is provided with 4 equi-distantly spaced vertical baffles of one inch width spaced radially inwardly one inch from the inside wall of the reaction vessel. Agitation is provided by a shaft mounted coincident with the vertical axis of the reaction vessel and provided with a 6-bladed turbine propeller of 2-inch diameter spaced 2 inches above the inside of the bottom of the reaction vessel. The shaft and propeller is rotated at 3,000 revolutions per minute. This reaction vessel is also provided with a tube for introducing a gaseous chlorine into the bottom of the reaction vessel beneath the propeller. The reaction vessel is also provided with a tube for introducing the mixture of water and tripotassium isocyanurate below the level of the reaction mass.

The reaction vessel is also provided with a tube extending vertically downward into the reaction vessel for removal of the reaction product. The reaction vessel is also provided with a thermometer and pH electrodes. To the above-described reaction vessel initially charged with 100 cubic centimeters of water is continuously added a 13.0% aqueous solution of tripotassium isocyanurate at a rate of 50 grams per minute and simultaneously with said addition is added chlorine gas at a rate so as to maintain the pH in the range of 7.3 to 7.5. During this addition the contents of the reaction vessel are maintained at a temperature in the range of 28° C. to 32° C. employing an ice-bath. During the respective additions the reaction mass is vigorously and continuously mixed by the agitator propeller and baffles. The reaction product removal tube mentioned above is so positioned that a volume of 500 cubic centimeters is maintained in the reaction vessel, the level in the reaction vessel being maintained constant by continuously pumping a portion of the reaction mass from the reaction vessel through the removal tube. A total of 17,460 grams of the 13.0 aqueous solution of tripotassium isocyanurate (which corresponds to 2,266 grams of dry tripotassium isocyanurate) is added and a total of 1,308 grams of chlorine is absorbed in the reaction system. The portions of the reaction product removed from the reaction vessel are continuously cooled to 10° C. and centrifuged. The total weight of the centrifuge cake is 2,140 grams of which 2,120 grams is potassium dichloroisocyanurate monohydrate. The centrifuge cake is then dried for three hours at 110° C. yielding 1,970 grams of Form II potassium dichloroisocyanurate (which corresponds to an 89.5% yield based on the tripotassium isocyanurate charged), a white crystalline solid whose internal symmetry is monoclinic and whose external symmetry is triclinic. This anhydrous form, namely Form II potassium dichloroisocyanurate, has the same crystal size and shape as its precursor, namely potassium dichloroisocyanurate monohydrate, which as aforenoted precipitated from the reaction mass and contains 7% by weight water hydration. This precursor exhibited an external and internal triclinic symmetry and is characterized by a distinctly different X-ray pattern than Form II potassium dichloroisocyanurate obtained upon dehydrating the said precursor.

*Example VI*

To a 5,000 cubic centimeter round-bottomed glass chlorination vessel is charged 50 cubic centimeters of water containing 0.5 gram of potassium dichloroisocyanurate and 2 grams of potassium chloride. To this reaction vessel which is equipped with a thermometer, a pH electrode, an agitator, an off-glass tube, and an ice-bath for controlling the reaction temperature is added over a period of about two hours 243 grams of tripotassium isocyanurate in the form of an 8.5% by weight aqueous solution thereof. Simultaneously with the addition of the aqueous tripotassium isocyanurate solution gaseous chlorine is added so as to bubble up through the aqueous reaction mass at a rate and with sufficient agitation (e.g. 1,000 to 2,000 r.p.m.) to disperse the chlorine in the aqueous reaction mass and maintain a pH of 7.6 to 7.8. Upon completion of the addition of the aqueous solution of tripotassium isocyanurate. The addition of chlorine is also stopped. Approximately 140 grams of chlorine is absorbed. Throughout this addition period which took about two hours the aqueous reaction mass is maintained at a temperature of 37±2° C. by employment of the ice-bath. The aqueous reaction mass is then cooled to about 10° C. while slowly agitating. After cooling to about 10° C. the aqueous reaction mass is filtered. The filter cake which is composed of potassium dichloroisocyanurate monohydrate and free water is then dried in an air-circulating oven at 110° C. yielding 184 grams of Form II potassium dichloroisocyanurate, the size and shape of this anhydrous product, i.e., Form II potassium dichloroisocyanurate is the same as that of its precursor, i.e. potassium dichloroisocyanurate monohydrate.

The filtrate (approximately 2,600 grams) which contains dissolved potassium dichloroisocyanurate is then vacuum concentrated at 45–50° C. to remove approximately 1,300 grams of water. The residue is then cooled to 10° C. and filtered and the filter cake, which contains potassium dichloroisocyanurate monohydrate and a small amount of free water, is then dried at 110° C. for about one hour yielding approximately 20 grams of Form II potassium dichloroisocyanurate. The total yield of Form II potassium dichloroisocyanurate is approximately 204 grams of approximately 86.5% of theory based on the tripotassium isocyanurate charged.

*Example VII*

To a 5,000 cubic centimeter round bottomed glass chlorination vessel is charged 50 cubic centimeters of water containing 0.5 gram of potassium dichloroisocyanurate and 2 grams of potassium chloride. To this reaction vessel which is equipped with a thermometer, pH electrodes, an agitator, an off-gas tube, and an ice-bath for controlling the reaction temperature is added over a period of about two hours 243 grams of tripotassium isocyanurate in the form of a 13.2% by weight aqueous solution thereof. Simultaneously with the addition of the aqueous tripotassium isocyanurate solution gaseous chlorine is added so as to bubble up through the aqueous reaction mass at a rate and with sufficient agitation (e.g. 1,000 to 2,000 r.p.m.) to disperse the chlorine in the aqueous reaction mass and maintain a pH of 7.6 to 7.8. Upon completion of the addition of the aqueous solution of tripotassium isocyanurate, the addition of chlorine is also stopped. Approximately 140 grams of chlorine is absorbed. Throughout this addition period which took about two hours the aqueous reaction mass is maintained at a temperature of 56 to 60° C., by employment of the ice-bath. The aqueous reaction mass is then vacuum concentrated at approximately 60° C. to remove 1,000 grams of water. The so concentrated mass is then filtered while at said temperature. The filter cake which is composed of Form I potassium dichloroisocyanurate and a small amount free water is then dried in an air circulating oven at 110° C. yielding 210 grams of Form I potassium dichloroisocyanurate, a white crystalline compound. This crystalline compound is in the form of flat plates and is characterized by an external and internal monoclinic symmetry.

In the process of this invention tripotassium isocyanurate is added in the form of an aqueous solution or aqueous slurry thereof, which flowable mixture preferably contains from about 3 to about 50 parts of tripotassium isocyanurate per 100 parts of water. It is particularly preferred however that the flowable mixture contains from about 10 to about 25 parts of tripotassium isocyanurate per 100 parts of water.

In general it is preferred that the amount of water in the reaction zone be in excess of that required to maintain the potassium chloride by-product in solution which amount ordinarily will be in excess of about 55% by weight of the total contents thereof and preferably in excess of about 70% of the total contents thereof. By so defining the water content the final dried reaction product is generally free of potassium chloride impurity. The presence of potassium chloride as an impurity however in the final product does not detract from its bleaching properties.

While as aforenoted the maintaining of a pH in the range of 7.0 to 8.5 but particularly from about 7.0 to about 7.9 in the reaction zone defines the stoichiometry of the reaction, that is substantially two moles of chlorine per mol of tripotassium isocyanurate, the amount of chlorine consumed in the reaction should not be more than about 2.05 moles per mol of tripotassium isocyanurate otherwise overchlorination will occur.

In the process of this invention it is particularly preferred that the respective reagents be added to an aqueous heel in the reactor, which heel can be water or an aqueous solution of potassium dichloroisocyanurate or an aqueous solution of potassium dichloroisocyanurate and potassium chloride.

As illustrative of the stability of potassium dichloroisocyanurate as compared to sodium dichloroisocyanurate 3.3 parts by weight of each in anhydrous powdered (−140 +200 mesh) crystalline form were mechanically mixed with 96.7 parts by weight of anhydrous sodium metasilicate and then placed in sealed jars and held in an oven at 136° F. for 311 hours. The respective mixtures were removed to determine the amount of available chlorine of the respective chlorine compounds that had been lost. The results are set forth below.

| Compound: | Percent loss of available chlorine after 311 hours |
|---|---|
| Sodium dichloroisocyanurate | 26.5 |
| Potassium dichloroisocyanurate, Form II | 1.0 |

The tripotassium isocyanurate reactant employed in Examples V, VI and VII was prepared by mixing three molecular proportions of potassium hydroxide in the form of a 40 to 50% aqueous solution thereof with one molecular proportion of isocyanuric acid ($H_3C_3O_3N_3$) in admixture with water, e.g. a water wet solid containing from 35 to 50% by weight moisture, to form a slurry, which slurry was then diluted with water to provide solutions of the stated concentrations of tripotassium isocyanurate in the said examples. According to the literature, tripotassium isocyanurate hydrolyzes readily upon exposure to moisture and particularly in aqueous solutions thereof to provide potassium hydroxide and dipotassium hydrogen isocyanurate ($K_2HC_3O_3N_3$) in equimolecular amounts, which mixture however functions in chemical reactions as if it was in fact tripotassium isocyanurate. Thus it is to be understood by the term "tripotassium isocyanurate" as employed herein and in the appended claims is meant to include tripotassium isocyanurate per se, equimolecular weight proportions of potassium hydroxide and dipotassium hydrogen isocyanurate obtained upon hydrolysis of said tripotassium isocyanurate or synthetic mixtures thereof obtained upon mixing equimolecular amounts of potassium hydroxide and dipotassium hydrogen isocyanurate in a dry or aqueous medium. As aforementioned tripotassium isocyanurate can be added to the reaction zone in the form of an aqueous slurry thereof and it is to be understood that such slurries include a mixture of water and equimolecular amounts of potassium hydroxide and dipotassium hydrogen isocyanurate wherein a portion of the latter is undissolved.

Example VIII

The procedure of Example V was repeated except that an aqueous solution containing 7% by weight of tripotassium isocyanurate and 7% by weight of trisodium isocyanurate instead of the aqueous solution of tripotassium isocyanurate, was charged to the reaction vessel at a rate of 48 grams per minute until a total of 17,250 grams of solution had been charged. During this period, a total of 1,325 grams of chlorine was absorbed in the reaction system. The wet reaction product, consisting of a mixture of sodium dichloroisocyanurate dihydrate and potassium dichloroisocyanurate monohydrate was dried according to the procedure described in Example V to form a mixture of anhydrous sodium dichloroisocyanurate and anhydrous FORM II potassium dichloroisocyanurate in a yield of 89.5% of theory based on the isocyanurates charged.

In the processes described in Examples I through VIII substantially no decomposition of the triazine ring of the cyanurates occurred, as evident from the yields obtained. Also, no detectable amount of $NCl_3$ was formed.

From the foregoing it is evident that trisodium isocyanurate and tripotassium isocyanurate are unexpectedly different from each other in certain respects as far as their reactions with chlorine are concerned. Thus, trisodium isocyanurate when reacted with gaseous chlorine at a pH above about 7.5 will decompose in significant amounts resulting in the formation of hazardous degradation products such as $NCl_3$ whereas when tripotassium isocyanurate is reacted with gaseous chlorine at pH 7.5 no significant decomposition occurs and little, if any, $NCl_3$ is formed. Such decomposition or $NCl_3$ formation does not take place to any appreciable extent until a pH of 8.5 is exceeded.

Also, tripotassium isocyanurate when reacted with chlorine gas at a pH of between 6.0 and 7.0 will usually form a reaction product consisting of a mixture of potassium dichloroisocyanurate and a potassium-containing complex chloroisocyanurate compound. Trisodium isocyanurate when reacted with chlorine gas at such pH range (e.g. pH 6.0–7.0) will form only sodium dichloroisocyanurate.

Surprisingly, when mixtures of trisodium and tripotassium isocyanaurate are reacted with gaseous chlorine at a pH in the range of 6.0 to 8.5, little or no $NCl_3$ is formed and a mixture of sodium and potassium dichloroisocyanurate or hydrates thereof is obtained.

The chemical and physical differences between sodium and potassium dichloroisocyanurate are also surprising. Thus, as noted hereinbefore, sodium dichloroisocyanurate can be obtained as (1) a dihydrate (2) a monohydrate and (3) in one anhydrous form. On the other hand, potassium dichloroisocyanurate can be obtained in only one hydrate form, that is, the monohydrate, but more surprisingly, can be obtained in two different anhydrous crystalline forms having different crystal structures.

What is claimed is:

1. The process which comprises bringing together and reacting chlorine and a compound selected from the group consisting of trisodium isocyanurate and tripotassium isocyanurate and mixtures thereof in an aqueous medium in a reaction zone maintained at a temperature in the range of from 0° C. to 60° C., the rate of addition and of mixing said chlorine and said compound being such as to maintain a pH in the range of about 6.0 to about 8.5, thereby forming an aqueous reaction mixture in said reaction zone, having a pH in said range, comprising an aqueous slurry of a compound selected from the group consisting of sodium dichloroisocyanurate and potassium dichloroisocyanurate and mixtures thereof, said compound being sodium dichloroisocyanurate when trisodium isocyanurate is reacted with chlorine and being potassium dichloroisocyanurate when tripotassium isocyanurate is reacted with said chlorine, and separating the said compound from the bulk of the aqueous phase of the reaction mixture.

2. The process which comprises bringing together and reacting chlorine and trisodium isocyanurate in an aqueous medium in a reaction zone maintained at a temperature in the range of 10° C. to 35° C., the rate of addition and of mixing said chlorine and said trisodium isocyanurate being such as to maintain a pH in the range of 6.0 to 7.5, thereby forming an aqueous reaction mixture in said reaction zone, having a pH in said range, comprising an aqueous slurry of sodium dichloroisocyanurate dihydrate, and separating the said dihydrate from the bulk of the aqueous phase of the reaction mixture.

3. The process as in claim 2 wherein the separated solids are dried to substantially anhydrous sodium dichloroisocyanurate.

4. The process which comprises bringing together and reacting chlorine and trisodium isocyanurate in an aqueous medium in a reaction zone maintained at a temperature in the range of about 20° C. to about 30° C., the rate of addition and of mixing said chlorine and said trisodium isocyanurate being such as to maintain a pH in the range from about 6.5 to about 7.3, thereby forming an aqueous reaction mixture in said reaction zone having a pH in said range comprising an aqueous slurry of sodium dichloroisocyanurate dihydrate, and separating the said dihydrate from the bulk of the aqueous phase of the reaction mixture.

5. The process of making sodium dichloroisocyanurate dihydrate which comprises simultaneously adding and mixing chlorine and an aqueous solution of trisodium isocyanurate, respectively in a reaction zone maintained at a temperature in the range of about 10° C. to about 35° C., the rate of addition and of mixing said chlorine and trisodium isocyanurate in said reaction zone being such as to maintain a pH in the reaction zone of from 6.5 to 7.3, thereby forming an aqueous reaction mixture in said reaction zone, having a pH in said range, comprising an aqueous slurry of sodium dichloroisocyanurate dihydrate, and separating the said dihydrate from the bulk of the aqueous phase of the reaction mixture.

6. The process which comprises continuously and simultaneously adding and mixing chlorine and an aqueous solution of trisodium isocyanurate, respectively in a reaction zone maintained at a temperature in the range of from about 10° C. to about 35° C. the rate of addition and of mixing said chlorine and trisodium isocyanurate being such as to maintain a pH in the range of from about 6.5 to about 7.3 thereby forming an aqueous reaction mixture in said reaction zone having a pH in said range and comprising an aqueous slurry of sodium dichloroisocyanurate dihydrate, continuously removing a portion of said reaction mixture from said reaction zone at a rate sufficient to maintain the volume of the reaction mixture in the reaction zone substantially constant, and separating the sodium dichloroisocyanurate dihydrate from the bulk of the aqueous phase of the portion of the reaction mixture thus removed.

7. The process as in claim 6 wherein the amount of water in the aqueous reaction mixture in the reaction zone is in excess of about 70% by weight of the total contents thereof.

8. The process of making potassium dichloroisocyanurate which comprises continuously and simultaneously bringing together and reacting chlorine and tripotassium isocyanurate in an aqueous medium in a reaction zone maintained at a temperature in the range of from 0° C. to 60° C., the rate of addition and of mixing said chlorine and tripotassium isocyanurate being such as to maintain a pH in said aqueous medium in the range of about 7.0 to 8.5, thereby forming an aqueous reaction mixture in said reaction zone having a pH in said range and comprising an aqueous slurry of a product selected from the group consisting of potassium dichloroisocyanurate, the monohydrate thereof and mixtures of these, and subsequently separating at least a portion of said product and a portion of the aqueous phase of said slurry from said reaction mixture.

9. The process of making crystalline potassium dichloroisocyanurate having a triclinic internal symmetry and a triclinic external symmetry which comprises continuously and simultaneously bringing together and reacting chlorine and tripotassium isocyanurate in an aqueous medium in a reaction zone maintained at a temperature in the range of from about 15° C. to about 50° C., the rate of addition and of mixing said chlorine and tripotassium isocyanurate being such as to maintain a pH in said aqueous medium in the range of from about 7.0 to about 7.9, thereby forming an aqueous reaction mixture in said reaction zone having a pH in said range comprising an aqueous slurry of potassium dichloroisocyanurate monohydrate and subsequently separating at least a portion of the said monohydrate from a portion of the aqueous phase of said slurry from said aqueous reaction mixture.

10. The process as in claim 9 wherein chlorine and tripotassium isocyanurate are added to a reaction zone initially charged with an aqueous slurry of potassium dichloroisocyanurate monohydrate.

11. The method of making crystalline anhydrous potassium dichloroisocyanurate having a monoclinic internal symmetry and a triclinic external symmetry which comprises continuously and simultaneously bringing together chlorine and a flowable mixture of water and tripotassium isocyanurate to form an aqueous reaction medium in a reaction zone maintained at a temperature in the range of about 15° C. to about 50° C., the rate of addition and of mixing said chlorine and mixture being such as to maintain a pH of from about 7.0 to 7.9, in said medium, thereby forming an aqueous reaction mixture in said reaction zone having a pH in said range comprising an aqueous slurry of potassium dichloroisocyanurate monohydrate having a triclinic internal and external symmetry, subsequently separating at least a portion of said monohydrate from said aqueous reaction mixture and thereafter drying the monohydrate so separated to produce said crystalline, anhydrous potassium dichloroisocyanurate.

12. The process as in claim 11 wherein potassium dichloroisocyanurate and the aqueous phase associated therewith are removed from the reaction zone at a rate sufficient to maintain the volume of the aqueous reaction mixture in the reaction zone substantially constant.

13. The process as in claim 11 wherein the said flowable mixture of water and tripotassium isocyanurate contains from about 3 to about 50 parts by weight of said cyanurate per 100 parts by weight of water.

14. The method of making crystalline anhydrous potassium dichloroisocyanurate having a monoclinic internal symmetry and a monoclinic external symmetry which comprises continuously and simultaneously bringing together chlorine and a flowable mixture of water and tripotassium isocyanurate to form an aqueous medium in a reaction zone maintained at a temperature in the range of about 56° C. to 60° C., the rate of addition and of mixing said chlorine and mixture being such as to maintain a pH of from about 7.0 to 8.5 in said zone thereby forming an aqueous reaction mixture in said reaction zone having a pH in said range comprising an aqueous slurry of anhydrous potassium dichloroisocyanurate having a monoclinic internal and external symmetry, subsequently separating at least a portion of said anhydrous potassium dichloroisocyanurate from the bulk of the aqueous phase of said reaction mixture.

References Cited in the file of this patent

UNITED STATES PATENTS

| | | |
|---|---|---|
| 2,913,460 | Brown et al. | Nov. 17, 1959 |
| 2,964,525 | Robinson | Dec. 13, 1960 |
| 2,969,360 | Westfall | Jan. 24, 1961 |

FOREIGN PATENTS

| | | |
|---|---|---|
| 634,801 | Great Britain | Mar. 29, 1950 |
| 1,149,758 | France | June 22, 1957 |